US006872371B2

United States Patent
Hakka et al.

(10) Patent No.: US 6,872,371 B2
(45) Date of Patent: Mar. 29, 2005

(54) METHOD AND APPARATUS FOR $NO_X$ AND $SO_2$ REMOVAL

(75) Inventors: Leo E Hakka, Dollard des Ormeaux (CA); Michel A. Ouimet, Montreal (CA)

(73) Assignee: Cansolv Technologies Inc., Montreal (*) Notice: Subject to any disclaimer, the term of this patent is extended or adjusted under 35 U.S.C. 154(b) by 228 days.

(21) Appl. No.: 10/211,514

(22) Filed: Aug. 5, 2002

(65) Prior Publication Data

US 2003/0026744 A1 Feb. 6, 2003

Related U.S. Application Data

(60) Provisional application No. 60/309,786, filed on Aug. 6, 2001.

(51) Int. Cl.[7] ............................................. C01B 21/00
(52) U.S. Cl. ..................................... 423/239.1; 423/235
(58) Field of Search ............................. 423/235, 239.1

(56) References Cited

U.S. PATENT DOCUMENTS

| | | | |
|---|---|---|---|
| 3,984,522 A | 10/1976 | Saito et al. | |
| 4,079,118 A | 3/1978 | Gorai | |
| 4,612,175 A | 9/1986 | Harkness et al. | |
| 4,708,854 A | 11/1987 | Grinstead | |
| 5,370,849 A | * 12/1994 | Chang | ..................... 423/239.1 |
| 5,658,545 A | * 8/1997 | Chang et al. | ............ 423/239.1 |
| 5,981,420 A | * 11/1999 | Nakano et al. | ............. 502/155 |

OTHER PUBLICATIONS

Translation of citation from Internation Search Report on Method and Apparatus of $No_x$ and $SO_2$ Removal. "Abgasreinigung" Michael Schultes, 1996, Springer–Vertag, Berlin, XP002221511 960836.

"Abgasreinigung" Michael Schultes, 1996, Springer–Vertag, Berlin, XP002221511 960836.

\* cited by examiner

*Primary Examiner*—Stanley S. Silverman
*Assistant Examiner*—Jonas N. Strickland
(74) *Attorney, Agent, or Firm*—Philip C. Mendes da Costa; Bereskin & Parr

(57) ABSTRACT

NO is removed from a gas stream by reacting NO with an absorbent to form a metal nitrosyl complex. The metal nitrosyl complex is reacted with sulfite and/or bisulfite to produce recoverable reaction products containing nitrogen and/or sulfur and to regenerate the reagent. The recoverable reaction products are then separated from the regenerated reagent.

23 Claims, 2 Drawing Sheets

METHOD AND APPARATUS FOR $NO_X$ AND $SO_2$ REMOVAL

FIELD OF THE INVENTION

This invention relates of a method and apparatus for the removal of NO and $NO_2$, collectively called $NO_x$, and optionally sulfur dioxide, $SO_2$, from a gas stream.

BACKGROUND OF THE INVENTION

Nitric oxide is a colorless low-polarity gas with a boiling point of −152° C. It is sparsely soluble in liquids, has relatively low chemical reactivity and does not exhibit significant acidic or basic character. Therefore, a cost effective, environmentally friendly process for removing NO from a gas is problematic.

The most common high efficiency method of removing NO from gas streams is to use selective catalytic reduction (SCR) of NO by ammonia over a catalyst bed at high temperature. While effective, this method is expensive in capital and operating cost and has a large footprint.

The reaction of the NO with various chemical reactants has been widely reported in the literature. Due to the low reactivity of NO, strong reagents are required for reacting it into another species. For example, oxidizing or reducing agents such as potassium permanganate, sodium hypochlorite, hydrogen peroxide and even sodium sulfite have been cited. The oxidation of NO produces $NO_2$, which is then absorbed into alkaline reagents such as caustic.

The NO molecule is able to form coordination complexes with various metal ions such as $Fe^{++}$, $Co^{++}$, $Ni^{++}$, and $Cu^+$. These complexes serve to activate the NO for reaction with milder, more convenient reagents, such as water, oxygen or sulfur dioxide (which in water solution exists as sulfite or bisulfite, depending on the pH).

Coordination complex formation by the NO, particularly with iron amine polycarboxylic acid complexes such as ferrous ethylenediaminetetraacetic acid complex ($Fe^{II}$ EDTA), for absorption of NO has also been widely reported. This allows efficient absorption of the NO into an aqueous medium. However, since the $Fe^{II}$ EDTA reagent is relatively expensive, the $Fe^{II}$ EDTA.NO product resulting from NO absorption must be regenerated back to $Fe^{II}$ EDTA in order to make the process economically practical. Since $SO_2$ and NO often occur together, as in flue gases produced by the combustion of sulfur bearing fuels, the most common method suggested for regeneration is the use of $SO_2$ dissolved in the medium to react the nitrosyl group of the complex to reduced 'N,S products' such as iminodisulfonate and hydroxylamine disulfonate salts, which then accumulate in the solvent.

The use of transition metal complexes for NO removal has several problems that must be addressed in the development of a practical process. One problem is that the metal may have a tendency to precipitate from solution, usually as the hydroxide, since a pH of about >4 is required for effective $SO_2$ removal. The use of appropriate chelating (sequestering) agents is effective in preventing precipitation. However, the chelating agent has an influence on the kinetics and equilibrium of NO complex formation.

A further problem is that different oxidation states of the metal have varying complex formation tendencies with NO, so maintaining the metal in the preferred oxidation state is required. For instance, ferrous iron, Fe(II), is readily oxidized to ferric iron, Fe(III), which is inactive for nitrosyl complex formation, by oxygen which may be present in the feed gas or reportedly even by NO itself. In addition, $N_2O$, which is a very potent greenhouse gas and therefore undesirable, may form under some reaction conditions, particularly at pH>7. Further, the metal chelate losses must be kept low. The metal nitrosyl complex should be regenerated in a reasonably rapid process to recover the active absorbent in small equipment with short residence time. Various schemes such as electrolysis and chemical reagents (including the sulfite/bisulfite ions) have been proposed. Finally, the end product from the NO must be dealt with. In Fe EDTA systems containing sulfite/bisulfite, a mixture of end products has been observed, including iminodisulfonate.

SUMMARY OF THE INVENTION

In accordance with the instant invention, NO is recovered from a gaseous feed stream by selective absorption to obtain a nitrosyl complex with a metal chelate followed by reduction of the complex by reaction with sulfite and/or bisulfite to obtain N,S products. The absorbent may be any chelating agent in solution and preferably an iron sequestering agent complex and preferably an iron amine polycarboxylic acid complex such as ferrous ethylenediaminetetraacetic acid complex ($Fe^{II}$ EDTA), an iron nitrilotriacetic acid complex, an iron hydroxyethyl ethylenediaminetriacetic acid complex and an iron diethylenetriaminepentaacetic acid complex. The absorbent solution rich in NO preferably also contains sodium, potassium, ammonium, or amine sulfites, which enable continuous high efficiency NO removal in a recirculating process as described in the following. It has also been found that a ratio of sequestering agent, such as amine polycarboxylic acid sequestering agent to iron of from 0.85 to as high as 2.5 moles/mole iron, preferably 1.0 to 1.2 moles/mole iron, may be used to maintain the iron complex in solution and to capture NO.

The absorption of NO by the $Fe^{II}$ EDTA seems to be insensitive to pH in the range of about 3 to 7, while the regeneration reactions of the $Fe^{II}$ EDTA.NO and the subsequent reactions of the N,S products also can occur in the same pH range. However, the initial reaction of the $Fe^{II}$ EDTA.NO with the $S^{IV}$ anions (sulfite or bisulfite) to denitrosate the complex seems to occur more efficiently, permitting up to about 99% NO removal from the feed gas on a steady state basis, if the pH of the solvent entering the digester where the regeneration reactions occur is greater than about 5. However, the pH is preferably kept less than about 7 to prevent the formation of $N_2O$ and to promote the hydrolysis reactions of the N,S products. By operating in this range, the NO is substantially converted to $N_2$, which is environmentally benign and may be vented to the atmosphere. While numerous intermediate compounds such as various N,S products are present in the absorbing solution at essentially steady state concentrations, the only other recoverable end byproduct from the process comprises oxidized sulfur reaction products such as sulfate and dithionate ions resulting from the sulfite ions by $O_2$ oxidation, by reaction with the $Fe^{II}$ EDTA.NO complex and by reaction with $Fe^{III}$ ions.

If $SO_2$ is also present with NO in the gaseous feed stream, it tends to absorb in and thereby acidify the absorbent solution. Then alkali, such as an alkali metal hydroxide or carbonate, is preferably added to increase the pH to the desired operating range of the digester after the gas-liquid contact apparatus 2. Preferably the alkali metal is sodium or potassium and, more preferably, potassium. If no $SO_2$ or an insufficient amount of $SO_2$ is present in the feed gas, then a suitable reagent for promoting the denitrosation and ferric iron reduction reactions must be added to the solvent prior to its entry into the digester. Suitable reagents are sulfite ion sources such as sodium sulfite or sodium pyrosulfite. Other more reduced sulfur species, such as sulfide or polysulfide salts, elemental sulfur, dithionate (hydrosulfite) or thiosulfate, which in the presence of oxidizing species such as the nitrosyl complex, oxygen or ferric ions tend to form sulfur oxyanions (e.g. sulfite species) which also carry out the necessary regeneration reactions.

$NO_2$ and $SO_2$, which are often also present in the feed gas stream, can be absorbed by alkaline buffering reagents. The quantity of these acidic gases that can be absorbed by a solution is dependent on the buffering capacity of the liquid. If the solution has sufficient buffering capacity, then essentially all of the acidic components may be removed from the feed gas. Alternatively, by using a solution of limited buffering capacity, only sufficient $SO_2$ as is required for the $NO_x$ removal and absorbent regeneration reactions is absorbed, the balance of the $SO_2$ flowing to a subsequent prior art process for either capture or conversion to another product.

Without limiting the scope or generality of the invention, it is believed that $SO_2$ is consumed in the following reactions.

$$Fe^{II}\ EDTA.NO + SO_2 \rightarrow Fe^{II}\ EDTA/Fe^{III}\ EDTA + N,S\ products \quad (1)$$

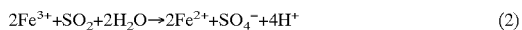
$$2Fe^{3+} + SO_2 + 2H_2O \rightarrow 2Fe^{2+} + SO_4^- + 4H^+ \quad (2)$$

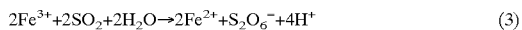
$$2Fe^{3+} + 2SO_2 + 2H_2O \rightarrow 2Fe^{2+} + S_2O_6^- + 4H^+ \quad (3)$$

$$SO_2 + \tfrac{1}{2}O_2 + H_2O \rightarrow SO_4^- + 2H^+ \quad (4)$$

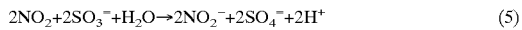
$$2NO_2 + 2SO_3^- + H_2O \rightarrow 2NO_2^- + 2SO_4^- + 2H^+ \quad (5)$$

Reaction (1) regenerates the active NO absorbent from the nitrosyl derivative formed when absorbent reacts to absorb NO. This is an essential part of the regenerable process. Reactions (2) and (3) regenerate the ferrous form of iron, which is active for NO absorption in the form of this EDTA complex. The ferric ion reportedly is formed by oxidation of ferrous iron by either $O_2$ or by NO. Reaction (4) is an undesired side reaction of $SO_2$. Sulfite ions reportedly react with nitrogen dioxide to form nitrite ions.

The N,S products, such as iminodisulfonate, may be further reacted by hydrolysis to form sulfate and primarily sulfamate ions or salts as a relatively stable end product. Sulfamate is a known scavenger for nitrite ions, forming nitrogen gas and sulfate.

Nitrogen dioxide ($NO_2$) may also be captured from the feed gas by reaction with the alkaline solution and reacted to compounds such as nitrite with sulfite or bisulfite ions.

If it is desired to simultaneously remove essentially all $SO_2$ from the feed stream, then additional alkaline buffer capacity can be provided by either additional alkali metal hydroxide via a separate stream or by providing an $SO_2$ removal amine component in the solution. The amine buffer may be amenable to regeneration by either steam stripping, by the addition of a chemical regeneration agent such as caustic or by other means such as electrodialysis. For example, the amount of alkaline buffer may be sufficient to permit the absorption of all or essentially all of the $SO_2$ in the feed stream. However, a separate regenerable absorption process may be conducted either downstream or upstream of the NO absorption process. Preferably the $SO_2$ absorption process is conducted upstream. In this case, a bulk $SO_2$ removal process that uses a regenerable absorbent, such as is disclosed in U.S. Pat. No. 5,019,361 (which is incorporated herein by reference) may be used to produce a feed stream to the NO absorption process of the instant invention that contains less than about 1,500 ppm $SO_2$. Accordingly, in accordance with one aspect of the instant invention, there is provided a method of removing NO from a gas stream comprising the steps of:

(a) reacting NO with an absorbent to form an absorbent solution containing a nitrosyl complex at a pH from about 5 to about 7;

(b) reacting the nitrosyl complex with a reduced sulfur reagent to produce recoverable reaction products containing nitrogen and/or sulfur and to regenerate the absorbent whereby a regenerated absorbent solution is formed; and, (c) separating recoverable reaction products from the regenerated absorbent solution.

In one embodiment, the method further comprises selecting an absorbent such that the nitrosyl complex is an iron nitrosyl complex.

In another embodiment, the method further comprises selecting the absorbent from the group consisting or an iron amine polycarboxylic acid complex, an iron nitrilotriacetic acid complex, an iron hydroxyethyl ethylenediaminetriacetic acid complex and an iron diethylenetriaminepentaacetic acid complex.

In another embodiment, the method further comprises selecting a ferrous ethylenediaminetetraacetic acid complex as the absorbent.

In another embodiment, the method further comprises selecting the reduced sulfur reagent from the group consisting of a sulfur +4 species, a sulfur −2 species, a sulfur −1 species, elemental sulfur, thiosulfate, dithionite and mixtures thereof.

In another embodiment, the method further comprises recovering the recoverable reaction products by crystallization.

In another embodiment, the method further comprises providing at least one of $SO_2$ and $H_2S$ in the gas stream and buffering the absorbent to absorb essentially all of the $SO_2$ and $H_2S$ in the gas stream.

In another embodiment, the method further comprises providing the absorbent as a solution having a concentration of up to about 0.5 molar of the absorbent.

In another embodiment, the method further comprises conducting the absorption of the NO at a pH from about 3 to 7.

In another embodiment, the method further comprises conducting the reaction of the iron nitrosyl complex with the sulfite at a pH from about 5 to 7.

In another embodiment, the method further comprises providing at least one of the SO2 and H2S with the NO in the gas stream and adding at least one of alkali metal hydroxide and carbonate to maintain the pH of the solution containing the nitrosyl complex from about 5 to about 7.

In another embodiment, no SO2 is present with the NO and the method further comprises adding alkali metal sulfite and/or bisulfite to maintain the pH of the solution containing the nitrosyl complex from about 5 to about 7 and to provide the reduced sulfur reagent.

In another embodiment, the method further comprises adjusting the amount of at least one of the iron and the complexing agent such that the absorbent solution comprises an iron complex and an excess of uncomplexed chelating agent.

In another embodiment, the method further comprises providing at least one of SO2 and H2S with the NO and conducting the absorption at a pH greater than about 3 and less than 7.

In another embodiment, the method further comprises providing at least one of SO2 and H2S with the NO and adding at least one of alkali metal hydroxide and carbonate to maintain the pH of the solution containing the iron nitrosyl complex in the range between about 5 and 7.

In another embodiment, the method further comprises providing sodium sulfite, ammonium sulfite, amine sulfite, sodium bisulfite, ammonium bisulfite or amine bisulfite as the reduced sulfur reagent.

In another embodiment, the method further comprises providing potassium sulfite, ammonium sulfite, amine sulfite, potassium bisulfite, ammonium bisulfite or amine bisulfite as the reduced sulfur reagent.

In another embodiment, the method further comprises the step of subjecting the gas stream to a regenerable SO2 removal process prior to step (a) of claim 1.

In another embodiment, the method further comprises providing as the absorbent solution a solution comprising from about 0.85 to 2.5 mole of complexing agent per mole of iron.

In another embodiment, the method further comprises providing as the absorbent solution a solution comprising from about 1 to 1.2 mole of complexing agent per mole of iron.

In accordance with another aspect of the instant invention, there is provided an apparatus for recovering NO from a gas stream comprising:

(a) an NO removal gas/liquid contactor having a gas inlet port in fluid flow communication with the gas stream, an NO lean gas exit port, an NO lean absorbent inlet port in fluid flow communication with a feed stream of the lean absorbent and an NO rich absorbent exit port for NO rich absorbent;

(b) a reactor downstream of the NO rich absorbent exit port, the reactor having an inlet port for receiving the NO rich absorbent at a pH from about 5 to about 7 and an outlet port; and, (c) a reduced sulfur reagent inlet port in fluid flow communication with the reactor wherein NO reacts with the absorbent in the gas/liquid contactor to form a nitrosyl complex and the nitrosyl complex reacts with reduced sulfur reagent in the reactor to produce recoverable oxidized sulfur reaction products and to regenerate the absorbent which exit the reactor via the outlet port.

In one embodiment, the gas stream includes at least one of SO2 and H2S and the apparatus further comprises:

(a) an SO2/H2S removal gas/liquid contactor positioned upstream from the NO removal gas/liquid contactor and having a gas inlet port in fluid flow communication with the gas stream, an SO2/H2S lean gas exit port in fluid flow communication with the gas inlet port of the NO removal gas/liquid contactor, an SO2/H2S lean SO2/H2S absorbent inlet port in fluid flow communication with a feed stream of the lean absorbent and an SO2/H2S rich SO2/H2S absorbent exit port for SO2/H2S rich absorbent; and, (b) a SO2/H2S regenerator downstream of the SO2/H2S rich absorbent exit port, the SO2/H2S regenerator having an inlet port for receiving the SO2/H2S rich absorbent and an outlet port for SO2/H2S lean absorbent.

In another embodiment, the apparatus further comprises a crystallizer for treating at least a portion of the oxidized sulfur reaction products.

In another embodiment, the absorbent is selected from the group consisting or an iron amine polycarboxylic acid complex, an iron nitrilotriacetic acid complex, an iron hydroxyethyl ethylenediaminetriacetic acid complex and an iron diethylenetriaminepentaacetic acid complex and the absorbent comprises from about 0.85 to 2.5 mole of chelating agent per mole of iron.

In another embodiment, the gas stream includes at least one of SO2 and H2S and the buffer capacity of the absorbent and the operating conditions of the gas-liquid contactor are adjusted so as to absorb only a part of the SO2 and H2S content of the feed gas.

In accordance with another aspect of the instant invention, there is provided an apparatus for removing NO and at least one of SO2 and H2S from a gas stream comprising:

(a) a gas/liquid contactor having a gas inlet port in fluid flow communication with the gas stream, an NO and SO2/H2S lean gas exit port, an NO and SO2/H2S lean absorbent inlet port in fluid flow communication with a feed stream of a lean absorbent and an NO and SO2/H2S rich absorbent exit port;

(b) an SO2 stripping tower having an inlet port in fluid communication with the NO and SO2/H2S rich absorbent exit port, an exit port for SO2 lean absorbent, a reboiler, an overhead condenser, a reflux line for returning condensate from the overhead condenser to the stripping tower as reflux and an exit port for SO2 from the overhead condenser;

(c) a surge tank for the SO2 lean absorbent wherein the surge tank temperature and the absorbent residence time in the surge tank is sufficient to substantially complete the regeneration reactions and convert the absorbent into NO and SO2/H2S lean absorbent.

In one embodiment, a pH control reagent is added to the NO and SO2/H2S lean solvent after the SO2/H2S stripping tower and before the surge tank to adjust the lean solution pH to between 5 and 7.

In another embodiment, the absorbent is selected from the group consisting or an iron amine polycarboxylic acid complex, an iron nitrilotriacetic acid complex, an iron hydroxyethyl ethylenediaminetriacetic acid complex and an iron diethylenetriaminepentaacetic acid complex and the absorbent comprises from about 0.85 to 2.5 mole of acid per mole of iron.

In another embodiment, the absorbent is selected from the group consisting or an iron amine polycarboxylic acid complex, an iron nitrilotriacetic acid complex, an iron hydroxyethyl ethylenediaminetriacetic acid complex and an iron diethylenetriaminepentaacetic acid complex and the absorbent comprises from about 1 to 1.2 mole of acid per mole of iron.

BRIEF DESCRIPTION OF THE DRAWINGS

These and other advantages of the instant invention will be more fully and completely understood in conjunction with the following description of the preferred embodiment wherein.

DETAILED DESCRIPTION OF THE INVENTION

In the preferred method, the absorbent solution utilized for the removal of NO comprises FeII EDTA and a reduced sulfur reagent, which in one embodiment is sodium sulfite.

It is thought that the FeII EDTA absorbs NO to form the corresponding iron nitrosyl complex FeII EDTA.NO. The nitrosyl complex is reacted with the reduced sulfur reagent to produce recoverable reaction products containing nitrogen and/or sulfur (N,S products) and to regenerate the reagent. Thus, for example, sulfite or bisulfite ions may react with the nitrosyl group to produce a mixture of N,S products, such as disodium iminodisulfonate and sodium sulfamate.

If the process does not have at least a small amount of sulfite or other reduced sulfur reagent present (e.g., more than about 0.1% by weight and preferably more than about 1% by weight), the rate of NO removal is rapidly reduced. Without being limited by theory, this is believed to occur due to either or both of retardation of nitrosyl group removal and of FeII EDTA reduction by the low concentration of sulfite. Accordingly, the absorbent solution preferably contains at least about 0.1% by weight of a reduced sulfur reagent that may be added upstream of the absorbent contacting feed gas stream 1 or concurrently with the absorbent contacting feed gas stream 1.

Figure 1:
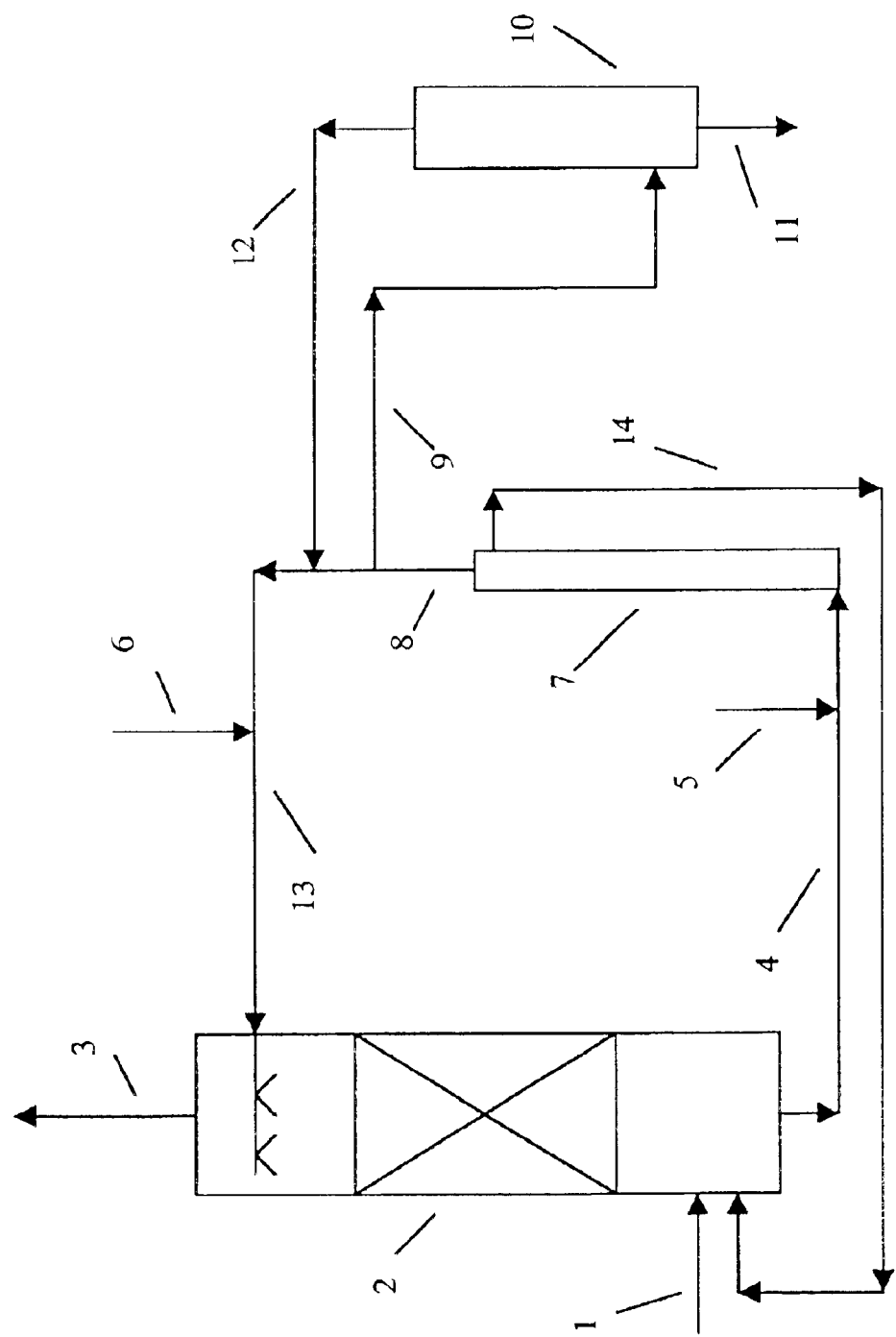
FIG. 1 is a schematic drawing of an apparatus according to this invention.

Referring to FIG. 1, the nitric oxide containing feed gas stream 1 flows into a gas-liquid contact apparatus 2, where intimate contact between the gas and the lean absorbent stream 13 occurs. The apparatus 2 may be any gas-liquid contactor or absorption tower known in the art such as a spray or packed tower. NO is absorbed into the lean absorbent, producing the rich NO containing absorbent, which exits from the apparatus 2 as stream 4. The gas depleted in NO leaves the apparatus 2 as stream 3 for either release into the atmosphere or for further treatment for, e.g., SO2 removal if stream 3 still contains SO2.

If the feed gas stream 1 comprises SO2, then stream 4 will be at a pH lower than stream 13, due to the absorption of acidic SO2. The amount of SO2 that is absorbed by stream 13 can be regulated in response to the SO2 concentration in stream 1 by one or more of the pH and buffer strength of stream 13 and the operating temperature and pressure of absorber 2. A high pH and buffer capacity of stream 13 and low temperature and high pressure in absorber 2 all favor higher SO2 concentration in stream 4.

The NO absorbent in stream 13, i.e. the FeII EDTA, is a reagent that reacts with the NO to form a complex. The reagent may be an iron amine polycarboxylic acid complex. Preferably, the absorbent may be iron complex of ethylenediaminetetraacetic acid, iron nitrilotriacetic acid, hydroxyethyl ethylenediaminetriacetic acid or diethylenetriaminepentaacetic acid.

In digester 7, a reduced sulfur reagent is reacted with the nitrosyl complex to remove the nitrosyl moiety from the iron nitrosyl complex that was formed in gas-liquid contactor 2 so as to regenerate the absorbent. Additional chemicals, such as a pH control agent to obtain or maintain the desired pH and additional or make up reduced sulfur reagent may be added upstream of, or directly into, digester 7.

For example, if the reduced sulfur reagent is sulfite, the sulfite reacts with the NO complex to produce reactivated NO absorbing reagent (e.g., FeII EDTA) and N,S compounds. The reduction of ferric ions, as described in reactions (2) and (3) that are set out previously, also occurs at least partly in the digester. The N,S compounds preferably react further to form sulfamic acid and sulfate. The digester may be any reactor which provides a sufficient residence time to permit the reactions to proceed to a desired degree of completion. Surprisingly, we find that a reaction time of less than 1 hour and even as low as 15 minutes is sufficient in our process to give high NO removal efficiency (e.g. 95% or higher). The reactor or digester 7 may be a tank, which may be stirred or unstirred, or a plug flow reactor.

In the preferred embodiment shown in FIG. 1, the rich absorbent stream 4 flows into the digester vessel 7. Alkali metal hydroxide (as may be required for pH control) and alkali metal sulfite, alkali metal pyrosulfite or other reduced sulfur reagent as described in the preceding (as may be required to provide the required reducing and denitrosating conditions) are added via stream 5 upstream of digester 7.

If the feed gas 1 contains SO2 in addition to the NO, then the lean absorbent 13 will absorb SO2 from the feed gas 1. The pH of the NO rich absorbent will be lowered by the absorbed SO2, so in this case an agent to increase the pH, such as alkali metal hydroxide or alkali metal carbonate, is added to raise the pH. The pH is desirably higher than 5 and preferably higher than about 6 up to a maximum of about 7 in order for the desired reactions to occur in the digester 7.

The reduced sulfur reagent may be selected from the group consisting of a sulfur +4 species, a sulfur −2 species, a sulfur −1 species, elemental sulfur, thiosulfate, dithionite and mixtures thereof. Accordingly, the reduced sulfur reagent may comprise or consist of SO2 or hydrogen sulfide in feed gas 1. If the feed gas 1 contains no SO2, then stream 5 will comprise alkali metal sulfite, alkali metal pyrosulfite or other reduced sulfur reagent as described in the preceding in order to provide pH control and to replace the sulfite ions or other reducing species consumed by reactions in the digester 7. Even if feed gas stream 1 contains SO2, additional reduced sulphur reagent may be added.

In one embodiment, SO2 is used to provide a source of a +4 sulfur species, as opposed to adding sodium sulfite into the liquid absorbent, such as via stream 5. Without being limited by theory, providing a feed gas that includes SO2 provides several advantages. First, it improves the NO mass transfer rate by creating a flow of gas to the liquid/gas interface in gas-liquid contact apparatus 2. Secondly, it increases the ferrous/ferric ratio in the liquid boundary layer by causing a high local SO2 concentration that increases the rate of reduction of the iron. Thirdly, a high local SO2 concentration in the liquid side boundary layer increases the rate of FeII EDTA.NO denitrosation, thereby increasing the effective concentration of the active NO absorbent at the liquid side boundary layer, which increases the rate of absorption.

In another embodiment, the reduced sulfur reagent comprises or consists of a sulfur −2 species and, more preferably, sodium sulfide. In one particularly preferred embodiment, a sulfite, such as sodium sulfite, is also present. Providing sodium sulfide, such as via stream 5, in the presence of a sulfite, results in the production of sodium thiosulfate. Without being limited by theory, it is believed that the presence of sodium thiosulfate stabilizes the iron concentration in the absorbent, reduces the oxidation of sulfite and promotes the reduction of Feiii to the active ferrous form. Accordingly, it is preferred for the process to incorporate sodium thiosulfate, either by its formation in situ or by the addition of sodium thiosulfate to the absorbent.

In some applications, such as refineries, gas streams, which contain H2S are available, Such streams, which are sometimes referred to as acid gas streams, may be utilized in this process in two different ways. First, the H2S could be provided in feed stream 1 to provide an additional gaseous source of a reduced sulfur species. Without being limited by theory, it is believed that providing H2S as a gaseous feed has similar benefits to providing SO2 to the gas-liquid contact apparatus 2. Alternately, or in addition, H2S could be fed to a boiler or combustor as fuel to produce SO2, which is then provided to gas-liquid contact apparatus 2 as part or all of feed gas stream 1.

Stream 6 is used to replace the other components of the solution lost due to evaporation, oxidation or by mechanical loss with stream 11 or in particulate filters. It may optionally be added at convenient points in the process other than the location shown.

The digester is preferably operated so as to provide sufficient time and temperature to cause the reaction between FeII EDTA.NO and the reduced sulfur agent to N,S products to proceed to at least substantial completion. This reaction is more rapid at a pH>5. Furthermore, with sufficient time (e.g. 15 to 60 minutes) and temperature (e.g. 50 to 100° C.) and at a pH less than about 7, the N,S products all are capable of eventually being transformed to sulfamic acid or sulfamate salts. These, we have found, can react with FeII EDTA.NO or NO2 derived species to produce N2 and sulfate.

At steady state operation, the N,S products will maintain a relatively constant concentration while the concentration of sulfate or dithionate anions increases steadily. The byproduct N2 may leave the digester 7 in stream 8 or it may optionally flow to the gas liquid contact apparatus 2 via line 14 Therefore, the preferred operating range for the digester is in the pH range of 5–7 and, more preferably, 6–7. The digester may be operated at a temperature from 60° C. to the boiling point of the solution, preferable, from 70° C. to the boiling point of the solution and most preferably from 75–85° C.

The sulfamic acid may react with FeII EDTA.NO or with nitrite ions to produce N2 which may be released to the atmosphere. By providing an effective concentration of sulfite, bisulfite or other reductively effective ions in the solution (e.g. >0.1% by weight), the ferric iron produced by oxidation is reduced to a sufficient degree to the ferrous state, thereby maintaining the ability of the complex to absorb NO. Thus the absorbent is regenerated.

Preferably digester 7 operates at a temperature of about 60–100° C. and with a liquid residence time of 15 minutes to 1 hour. The formation of N,S products, their hydrolysis, the reduction of FeIII EDTA to FeII EDTA and at least some of the reaction of FeII EDTA.NO with sulfamic acid to produce N2 occur at an accelerated rate in the digester. It will be appreciated that some of these reactions may also occur before or after the mixture exits digester 7.

After the digester, the solvent is again lean in NO and exits digester 7 via stream 8 to flow to the gas-liquid contact apparatus 2 for absorption of NO (i.e. stream 13).

In another embodiment, potassium is used as the alkali metal in place of sodium for pH control. Potassium could be added as a hydroxide or a carbonate. One advantage of using potassium as opposed to sodium is that a commercial product can be obtained from the spent potassium. For example, potassium salts, or potassium sulfate after decomposition of the dithionate to sulfate and SO2, can be used as a fertilizer.

The sulfite consumed in reacting with the NO and in reducing FeIII EDTA to FeII EDTA forms sulfate and/or dithionate, which is then removed from the system, preferably by crystallization, to prevent buildup of these salts. Crystallization of the potassium or preferably the sodium salts in a suitable apparatus, such as a scraped surface crystallizer, operating at a low temperature such as 0–20° C. is an effective means of removing these salts from the system and preventing adventitious solids precipitation in the system. A crystallizer 10 is shown in FIG. 1 operating on a slipstream 9, producing solid alkali metal salt byproduct stream 11 and a lean absorbent stream 12 which is reduced in sulfate and dithionate content.

If essentially complete desulfurization is desired in the process, i.e. additional to that required to provide the SO2 reagent necessary for NOx removal, this may be effected by providing sufficient buffering capacity in the lean absorbent stream 13. The excess sulfite which is not consumed in the FeII EDTA.NO denitrosation, FeIII reduction or O2 oxidation of the SO2 must be removed from the solution in order to regenerate it for again feeding it as lean absorbent 13 into the apparatus 2. This may be achieved by various methods such as crystallizing out sodium sulfite at a low temperature of 0–20° C. along with sodium sulfate or by precipitating the sulfite as a calcium salt by the addition of limestone or lime. Alternatively, we find that when using sodium sulfite oxidation of sulfite occurs, perhaps due to catalysis by a sequestered iron atom occurs. This converts sulfite to sulfate or dithionate, which may then be crystallized out.

The mole ratio of chelating agent to iron is maintained so as to ensure that essentially all, and preferably all, of the iron is maintained in solution. With ammonium salts, a 2 to 1 ratio of EDTA to iron atoms is generally required to obtain a homogeneous solution. For alkali metal salts and amine salts the EDTA to iron mole ratio is preferably at least about 1:1, and more preferably about 1.2:1. This ensures that the iron is maintained in solution, even if some of the EDTA is degraded into an ineffective form by, for example, oxidation. Other chelating agents may require different chelating agent-to-metal ratios may be required.

An advantage of providing a mole ratio of chelating agent to iron to maintain free chelating agent in solution is that the free chelating agent, (e.g. free EDTA) will tend to solubilize and hold in solution metal ions produced by corrosion of the plant equipment or entering with the feed gas or with makeup water or chemical streams. For example, calcium or magnesium ions will tend to form tightly adhering sulfite or sulfate salt scaling of the equipment, thereby interfering with the proper functioning of the equipment.

Another advantage of having chelating agent (e.g. EDTA) in the solvent that is not complexed with a metal ion is that hazardous air pollutants such as toxic metals will tend to be held in solution by complexation with the EDTA. In particular, mercury may enter with the feed gas both as oxidized ionic mercury or as a vapor of the metal. The ionic mercury will tend to be chelated by the EDTA and thus be held in solution and be somewhat protected from reduction back to the elemental form by reducing agents such as sulfite in the solvent. Elemental mercury vapor entering with the feed gas may be oxidized to Hg++ by oxygen or by other oxidizing species in the solvent, such as FeIII EDTA, to the ionic form and thus held in solution as the EDTA complex.

Figure 2:
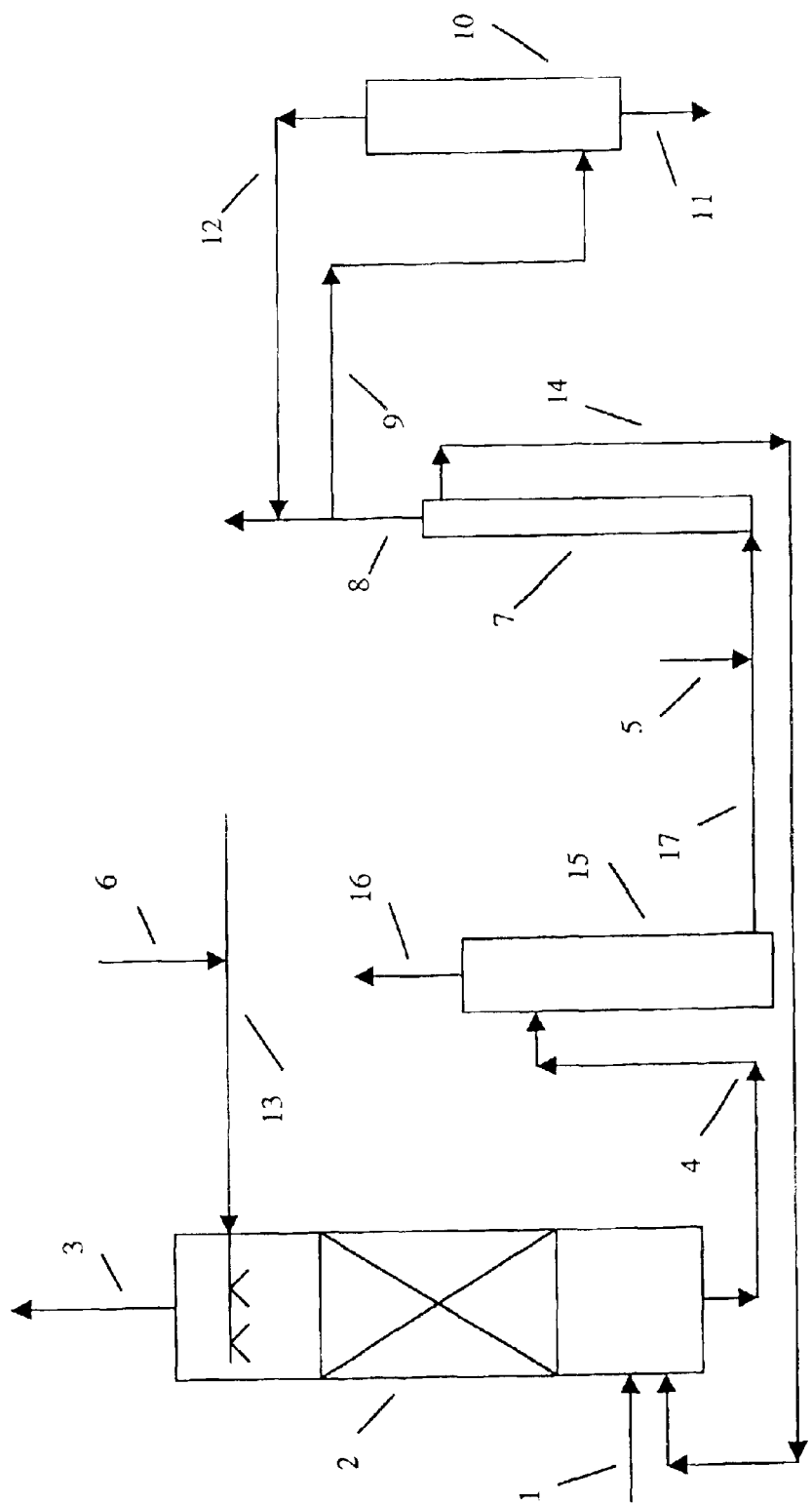
FIG. 2 is another embodiment of the invention which illustrates regenerable SO2 removal from the feed gas steam in addition to NOx removal.

A regenerable SO2 absorbing amine may also be used to provide the alkalinity for complete SO2 removal. For example, referring to FIG. 2, regeneration of the rich solvent with respect to SO2 is performed by steam stripping of the solution 4 in the stripper 15. The byproduct SO2 leaves the stripper in stream 16 and the solvent depleted in SO2 flows to the crystallizer 10 via stream 17. The steam stripping step may in fact substitute for the digester 7 if sufficient time and temperature is provided to also complete the denitrosation, N,S product reactions and the FeIII reduction in the stripper equipment. Sulfate or dithionate salts may still be removed by crystallization as alkali metal salts or by other means such as electrodialysis.

The overall reactions believed to occur in this process are then summarized as:

1. Absorption of NO from the feed gas by, e.g., 0.01–1 molar $Fe^{II}$ EDTA to form $Fe^{II}$ EDTA.NO.
2. Oxidation of $Fe^{II}$ EDTA to $Fe^{III}$ EDTA by NO and/or $O_2$ which may be present in the gas stream.
3. Replenishment of the reagent consumed in the regeneration reactions by addition of reduced sulfur reagents such as alkali metal sulfite or a bisulfite, alkali metal pyrosulfite, sulfide as a hydrogen sulfide or its salts, sulfur, dithionite or thiosulfate to the system via stream 5 or, if the feed gas contains sufficient $SO_2$, by absorption of $SO_2$ from the feed gas by a buffer such as alkali metal hydroxide added as stream 5 or a steam regenerable or non-steam-regenerable amine component of the solvent.
4. Reaction of sulfite/bisulfite with the nitrosyl group of $Fe^{II}$ EDTA.NO to give N,S products.
5. Reaction of the N,S products to produce sulfamic acid.
6. Reaction of sulfamic acid with $Fe^{II}$ EDTA.NO to produce molecular nitrogen ($N_2$), sulfate and $Fe^{II}$ EDTA or with nitrite or $NO_2$ to produce $N_2$ and sulfate.
7. Reduction of $Fe^{III}$ EDTA to $Fe^{II}$ EDTA by sulfite/bisulfite or other reducing species which may be present.
8. Removal of sulfate, dithionate or other sulfur oxyanion byproducts from the system by crystallization, precipitation or electrodialysis.
9. Optionally, removal of excess sulfite/bisulfite from the solution by, e.g., either crystallization, precipitation by a chemical reagent such as limestone or lime, or by steam stripping.

Reactions 4–7 occur in digester 7 and may reach steady state levels if digester 7 has a sufficient residence time.

Since components of the solvent may be lost either mechanically or by oxidation, these losses which are small can be replaced through stream 6 as required. Surprisingly, in contrast to the prior art, we find that we are able to achieve continuous high NO removal of >95% in the cyclic processes described without the need for electrochemical reduction or chemical reactants except sulfite or other reduced sulfur reagents as described herein. Caustic is preferably used to maintain the pH in the desired range and to provide the sodium ions for precipitating sodium sulfate. Sodium sulfite or sodium pyrosulfite is used for pH control and additionally to supply the sulfite if the feed gas does not contain sufficient SO2. Similar performance was observed when using 0.1 molar FeII EDTA in an absorbent containing N-(2-hydroxyethyl)piperazine monosulfate and monosulfite. This organic buffer provides good SO2 absorption in a steam regenerable process. With the addition of the FeII EDTA and removal of sulfate by either electrodialysis or other methods such as precipitation, simultaneous cyclical removal and subsequent regeneration of both SO2 and NOx is achieved in one absorption step.

For example, testing was performed using 10 ml/minute of solvent of about 0.4 molar sodium sulfite and 0.1 molar FeII EDTA and treating 2 liters/minute of feed gas of 3500 ppmv SO2, 1000 ppm NO, 5% vol. O2 with the balance nitrogen. The glass absorber column was 2.5 cm outside diameter, contained 32 cm of 4 mm 316 SS Porapak mesh saddles. The lean solvent temperature was kept at 50° C. The pH of the solvent was maintained at 6–5 by addition of caustic solution and the digester was kept at 75° C. and the residence time of the solvent in it was 30 minutes. The treated gas NO concentration remained steady at less than about 10 ppm for more than 30 hours, which corresponds to about 30 turns of the solvent inventory in the test apparatus, indicating that steady state operation has been achieved. The solvent was then analyzed by ion chromatography was found to contain high levels of sulfate and dithionate and some N,S products.

EXAMPLE

The functioning of the process is illustrated by the following example. Flue gas from a catalytic cracking unit regenerator which contained an average of about 140 ppmv of SO2 and about 100 ppmv of NO, with the balance essentially N2, CO2, H2O and about 2% of O2 was treated in a pilot unit. The unit had an absorber column packed with 8 feet of structured packing. The solvent residence time in the digester tank was about 45 minutes at a temperature of 85° C. The solvent was 0.075 molar in iron EDTA complex. Sodium sulfite or sodium pyrosulfite was added to the solvent for maintaining the solution sulfite concentration at the desired level and the pH at about 6.8. The solvent during the scrubbing experiment contained about 4.0% wt. sulfite anions (SO3=), 2.2% wt. sulfate, 5.5% dithionate and 3000 ppmw sulfamate, all present as the as the sodium salts. The absorber temperature was 85° C. At a gas flow rate of 15 cubic feet per minute and a solvent flow rate of one gallon per minute, 97% of the NO was removed

What is claimed is:

1. A method of removing NO from a gas stream comprising the steps of:
   (a) reacting NO with an absorbent to form an absorbent solution containing a nitrosyl complex at a pH from about 5 to about 7;
   (b) reacting the nitrosyl complex with a reduced sulfur reagent at a temperature above 60° C. to produce recoverable reaction products including sulfate and/or dithionate and $N_2$ and to regenerate the absorbent whereby a regenerated absorbent solution is formed, without the addition of lime or limestone; and,
   (c) separating sulfate and/or dithionate and $N_2$ from the regenerated absorbent solution, wherein sulfate and/or dithionate are recovered by reducing the temperature of the regenerated absorbent solution to crystallize the sulfate and dithionate.

2. The method as claimed in claim 1 wherein the method further comprises selecting an absorbent such that the nitrosyl complex is an iron nitrosyl complex.

3. The method as claimed in claim 2 further comprising selecting the absorbent from the group consisting or an iron amine polycarboxylic acid complex, an iron nitrilotriacetic acid complex, an iron hydroxyethyl ethylenediaminetriacetic acid complex and an iron diethylenetriaminepentaacetic acid complex.

4. The method as claimed in claim 3 further comprising selecting the reduced sulfur reagent from the group consisting of a sulfur +4 species, a sulfur −2 species, a sulfur −1 species, elemental sulfur, thiosulfate, dithionite and mixtures thereof.

5. The method as claimed in claim 2 further comprising conducting the reaction of the iron nitrosyl complex with the sulfite at a pH from about 5 to 7.

6. The method as claimed in claim 5 further comprising providing at least one of the $SO_2$ and $H_2S$ with the NO in the gas stream and adding at least one of alkali metal hydroxide and carbonate to maintain the pH of the solution containing the nitrosyl complex in the range between about 5 and 7.

7. The method as claimed in claim 5 wherein no $SO_2$ is present with the NO and the method further comprises adding alkali metal sulfite and/or bisulfite to maintain the pH of the solution containing the nitrosyl complex in the range between about 5 and 7 and to provide the reduced sulfur reagent.

8. The method as claimed in claim 3 further comprising providing the absorbent as a solution having a concentration of up to about 0.5 molar of the absorbent.

9. The method as claimed in claim 3 further comprising adjusting the amount of at least one of the iron and the chelating agent such that the absorbent solution comprises an iron complex and an excess of uncomplexed chelating agent.

10. The method as claimed in claim 9 further comprising providing at least one of $SO_2$ and $H_2S$ with the NO and adding at least one of alkali metal hydroxide and carbonate to maintain the pH of the solution containing the iron nitrosyl complex in the range between about 5 and 7.

11. The method as claimed in claim 1 further comprising selecting a ferrous ethylenediaminetetraacetic acid complex as the absorbent.

12. The method as claimed in claim 11 further comprising providing as the absorbent solution a solution comprising from about 0.85 to 2.5 mole of complexing agent per mole of iron.

13. The method as claimed in claim 11 further comprising providing as the absorbent solution a solution comprising from about 1 to 1.2 mole of complexing agent per mole of iron.

14. The method as claimed in claim 1 further comprising selecting the reduced sulfur reagent from the group consisting of a sulfur +4 species, a sulfur −2 species, a sulfur −1 species, elemental sulfur, thiosulfate, dithionite and mixtures thereof.

15. The method as claimed in claim 1 further comprising providing at least one of SO2 and H2S in the gas stream and buffering the absorbent to absorb essentially all of the SO2 and H2S in the gas stream.

16. The method as claimed in claim 1 further comprising providing the absorbent as a solution having a concentration of up to about 0.5 molar of the absorbent.

17. The method as claimed in claim 1 further comprising conducting the absorption of the NO at a pH from about 3 to 7.

18. The method as claimed in claim 17 further comprising providing at least one of the $SO_2$ and $H_2S$ with the NO in the gas stream and adding at least one of alkali metal hydroxide and carbonate to maintain the pH of the solution containing the nitrosyl complex from about 5 to about 7.

19. The method as claimed in claim 17 wherein no $SO_2$ is present with the NO and the method further comprises adding alkali metal sulfite and/or bisulfite to maintain the pH of the solution containing the nitrosyl complex from about 5 to about 7 and to provide the reduced sulfur reagent.

20. The method as claimed in claim 1 further comprising adjusting the amount of at least one of the iron and the chelating agent such that the absorbent solution comprises an iron complex and an excess of uncomplexed chelating agent.

21. The method as claimed in claim 20 further comprising providing at least one of $SO_2$ and $H_2S$ with the NO and conducting the absorption at a pH greater than about 3 and less than 7.

22. The method as claimed in claim 1 further comprising providing sodium sulfite, ammonium sulfite, amine sulfite, sodium bisulfite, ammonium bisulfite or amine bisulfite as the reduced sulfur reagent.

23. The method as claimed in claim 1 further comprising the step of subjecting the gas stream to a regenerable $SO_2$ removal process prior to step (a) of claim 1.

* * * * *